United States Patent [19]

Ohta et al.

[11] Patent Number: 4,790,648
[45] Date of Patent: Dec. 13, 1988

[54] CLOSURE FOR CABLE CONNECTOR

[75] Inventors: Shin-ichiro Ohta; Hidehisa Miyazawa; Etsuo Tanabe; Shigeru Tachigami, all of Ichihara, Japan

[73] Assignee: The Furakawa Electric Co., Ltd., Ichihara, Japan

[21] Appl. No.: 81,780

[22] Filed: Aug. 5, 1987

[30] Foreign Application Priority Data

Aug. 12, 1986 [JP] Japan .................. 61-122941[U]

[51] Int. Cl.$^4$ ................................ G02B 6/36
[52] U.S. Cl. ........................ 350/96.20; 350/96.23
[58] Field of Search .............. 350/96.2, 96.21, 96.22, 350/96.23

[56] References Cited

U.S. PATENT DOCUMENTS

| | | | |
|---|---|---|---|
| 4,045,121 | 8/1977 | Clark | 350/96.21 |
| 4,139,260 | 2/1979 | Bouygues et al. | 350/96.22 |
| 4,312,563 | 1/1982 | Mead | 350/96.2 |
| 4,332,435 | 6/1982 | Post | 350/96.2 |
| 4,339,171 | 7/1982 | Makuch et al. | 350/96.2 |
| 4,411,491 | 10/1983 | Larkin et al. | 350/96.21 |
| 4,496,213 | 1/1985 | Borsuk | 350/96.21 X |
| 4,733,935 | 3/1988 | Gandy | 350/96.21 |
| 4,753,499 | 6/1988 | Malkani et al. | 350/96.20 |
| 4,753,500 | 6/1988 | Guazzo | 350/96.20 |

*Primary Examiner*—John D. Lee
*Attorney, Agent, or Firm*—Foley & Lardner, Schwartz, Jeffery, Schwaab, Mack, Blumenthal & Evans

[57] ABSTRACT

A closure for a cable connector covered at the ends of the cables connected to each other in a sleeve through end face plates for closing both ends of the sleeve. Grasping fittings are mounted at the ends of the cable contained in the sleeve which has axial restricting means and/or rotational restricting means provided in the sleeve for preventing the grasping fittings from moving axially and/or rotationally. Thus, the closure can provide mechanical strength sufficient for enduring loads such as tension, compression and twist transmitted through the cables.

6 Claims, 4 Drawing Sheets

CLOSURE FOR CABLE CONNECTOR

BACKGROUND OF THE INVENTION

This invention relates to a closure for a cable connector used for the connector of cables containing electric conductors and/or optical transmitters as core wires.

A communication cable contains either one or both of electric conductor core wires (metal core wires) and optical transmitter core wires (optical fiber core wires) in a cable sheath known per se.

The closure of the above-described cable connector is generally constructed, as shown in FIGS. 9 to 11, corresponding to the cable connector.

The cable connector and the closure will be described below.

In FIGS. 9 to 11, in a paired cable 1, core wires 2 led from the end of the cable are connected entirely as a pair to form a core wire connector (not shown).

The closure for covering the core wire connector mainly includes a plastic sleeve 3, which is longitudinally split, flanges 5 formed along a split surface 4 are coupled by bolts 6 and nuts 7 at both sides to be associated in a cylindrical shape.

The split surface 4 is sealed by packings 8 interposed between the flanges 5 at both sides.

Recesses 9 are respectively formed at both ends of the sleeve 3, and rubber end face plates 10 are respectively engaged within the recesses 9 of the sleeve 3 to enclose both the ends of the sleeve 3.

Cable penetrating openings 11 are formed at the centers of the end face plates 10, and radial or diameter split surface 12 is radially formed to readily mount the cable 1.

Sealers 13 are respectively interposed to seal the bonding surfaces between the cable 1 and the end face plate 10, between the split surfaces 12 of the end face plates 10, and between the end face plate 10 of the sleeve 3.

In order to grasp the ends of the cables 1 fed into the sleeve 3 through the cable penetrating openings 11 of the end face plates 10, grasping fittings 14 are provided adjacent to the end face plates 10 to be connected through a connecting rod 15 with each other.

The core wires 2 of the cables 1 are connected by the core wire connector, not shown, and contained in the sleeve 3 known per se.

Since the grasping fittings 14 are completely separated from the sleeve 3 in the above-described closure and have no means for stopping moving of the grasping fittings 14, when loads such as tension, compression or twist acting on the cables 1 are applied into the sleeve 3, the strength for enduring against the loads includes only a pressing force producing by clamping the end face plates 10 and the bonding strengths of the sealers 13.

Therefore, when these loads are applied to the cables 1, unreasonable force is acted on the core wire connector including the grasping fittings 14 and the sealers 13 to cause the sleeve 3 to be deteriorated in the airtightness and the core wire connector (particularly in case of optical fiber) to be damaged or disconnected.

SUMMARY OF THE INVENTION

Accordingly, an object of this invention is to provide a closure for a cable connector which can eliminate the above-mentioned drawbacks and can provide mechanical strength sufficient for enduring loads such as tension, compression and twist transmitted through the cables.

In order to achieve the above and other objects of the invention, there is provided an enclosure for a cable connector covered at the ends of the cables connected with each other in a sleeve through end face plates for closing both the ends of the sleeve. Grasping fittings are mounted at the ends of the cable contained in the sleeve comprising axial restricting means and/or rotational restricting means provided in the sleeve for preventing the grasping fittings from moving axially and/or rotationally.

The above and other related objects and features of the invention will be apparent from a reading of the following description of the disclosure found in the accompanying drawings and the novelty thereof pointed out in the appended claims.

DESCRIPTION OF THE PREFERRED EMBODIMENTS

Embodiments of a closure for a cable connector according to the present invention will be described in detail with reference to the accompanying drawings.

Figure 9:
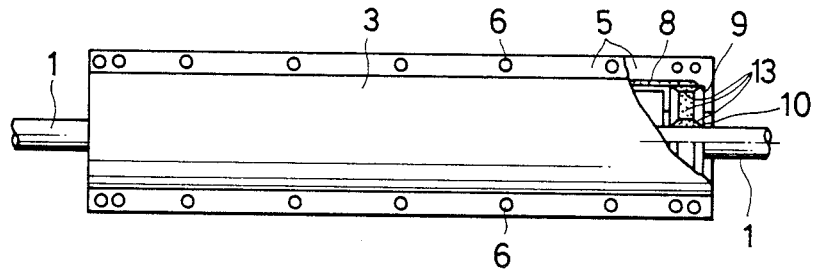
FIG. 9 is a partial fragmentarily sectional plan view of a conventional closure.
Figure 10:
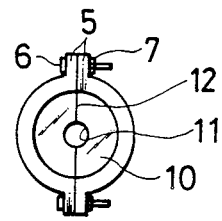
FIG. 10 is a right side view of FIG. 9.
Figure 11:
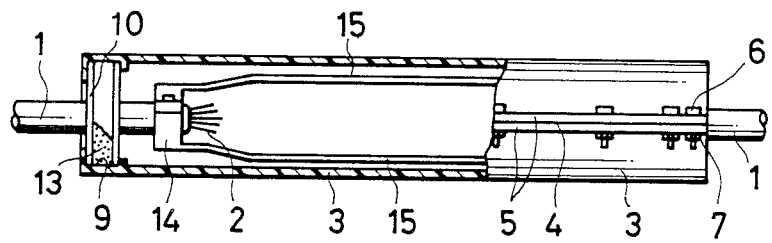
FIG. 11 is a partial fragmentarily side view of FIG. 9.

FIGS. 1 to 6 show a first embodiment of a closure for a cable connector according to the present invention, wherein the same reference numerals as those in FIGS. 9 to 11 designate the same or corresponding parts.

In the first embodiment in FIGS. 1 to 6, engaging recesses 16 for grasping fittings 14 are formed adjacent to engaging recesses 9 for end face plates 10 on the inner surfaces of a sleeve 3.

Figure 1:
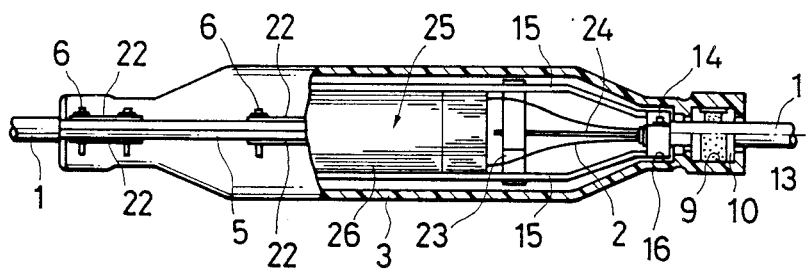
FIG. 1 is a partial fragmentarily longitudinal sectional plan view showing a first embodiment of a closure for a cable connector according to the present invention.
Figure 2:
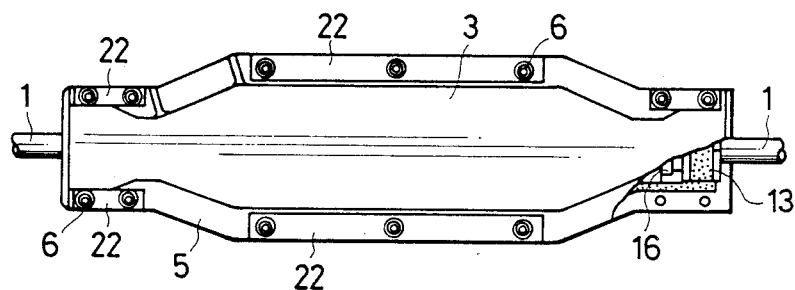
FIG. 2 is a partial fragmentarily longitudinal side view of the first embodiment of the closure of the invention.
Figure 3:
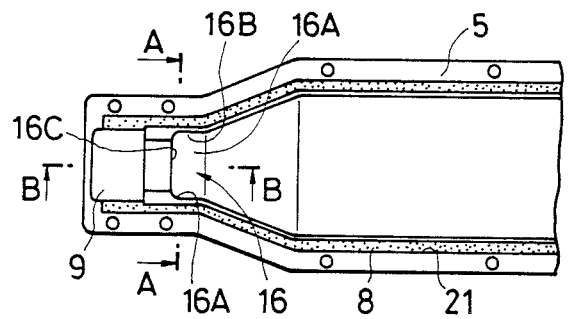
FIG. 3 is a partial plan view of split sleeve piece of the first embodiment.
Figure 4:
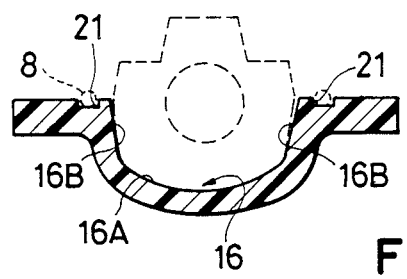
FIG. 4 is a lateral sectional view taken along the line A—A of FIG. 3.
Figure 5:
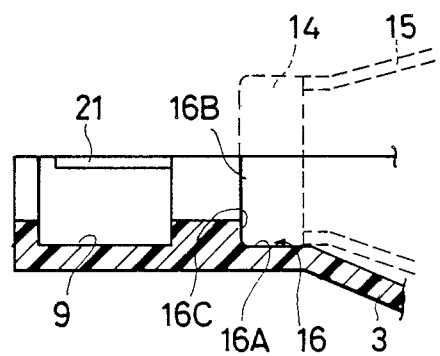
FIG. 5 is a sectional view taken along the line B—B of FIG. 3.

As apparent with reference to FIGS. 3 to 5, the engaging recesses 16 are formed in noncircular recess shape of a circular-arc surface 16A and tapered surfaces 16B rising from both ends of the circular-arc surface 16A as well as of a rising wall surface 16C adjacent to the inside of the engaging recess 9.

The grasping fittings 14 are formed on the outer periphery thereof of a circular-arc surface 14A and a tapered surface 14B in noncircular shape to be contacted with the recess surface of the engaging recess 16 corresponding to the engaging recess 16.

Figure 6:
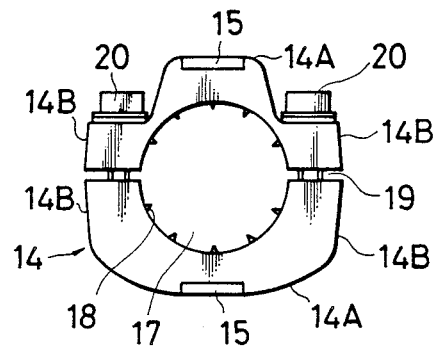
FIG. 6 is a front view of grasping fittings of the first embodiment.

As particularly apparent with reference to FIG. 6, the grasping fittings 14 have a grasping opening 17 for the cable 1 at the center thereof, an engaging projection 18 for the cable 1 provided on the inner surface of the grasping opening 17, and a split surface 19 formed to cross the grasping opening 17 so that the split surfaces 19 are coupled by a bolt 20.

Connecting rods 15 are secured at the split surfaces 19 as a boundary over the right and left side grasping fittings 14.

The grasping fittings 14 are engaged within the engaging recess 16.

Grooves 21 are formed longitudinally on the inner surfaces of the flanges 5, and packings 8 are contained in the grooves 21.

Pad metals 22 are contacted with both the flanges 5 to clamp the flanges 5 through the pad metals 22.

The pad metals 22 have threaded openings, with which bolts are engaged.

Supports 23 of tension members 24 are disposed in the sleeve 3 perpendicularly to both the connecting rods 15 adjacent to the insides of the grasping fittings, and the supports 23 are supported at both ends thereof through the connecting rods 15 passing the supports 23.

The tension members 24 of the cables 1 are clamped to be supported to the supports 23 known per se.

Core wire connector containing chamber 25 is formed between both the supports 23 in the sleeve 3.

In case that the core wires of the cables 1 consist of optical fibers, fiber containing sheets 26 are stacked in the core wire connector containing chamber 25 for containing the optical fibers.

In the closure for the cable connector exemplified in FIGS. 1 to 6, when tension load, compression load and/or twisting load are applied to the cable 1, the enclosure can endure against the loads as below.

When the tension load is applied to the cable 1, the grasping fittings 14 contact the rising wall 16C of the engaging recess 14 in the sleeve 3 to prevent the grasping fittings 14 from moving along the longitudinal direction of the sleeve 3.

When the compression load is applied longitudinally to the cable 1, both the grasping fittings 14 contact the rising wall 16C of the engaging recess 16 and the connecting rod 15 is installed over both the grasping fittings 14 of the contacted state to prevent the grasping fittings 14 from moving along the longitudinal direction of the sleeve 3.

When the twisting load is applied to the cable 1, the grasping fitting 14 do not rotate with respect to the sleeve 3 since the grasping fittings 14 of engaged state and the engaging recess 16 are formed in noncircular shape in the profiles, and the sleeve 3 and the grasping fittings 14 do not relatively rotate and hence the cables of the connected state (including the core wire connector) do not generate a twisting stress.

Figure 7:
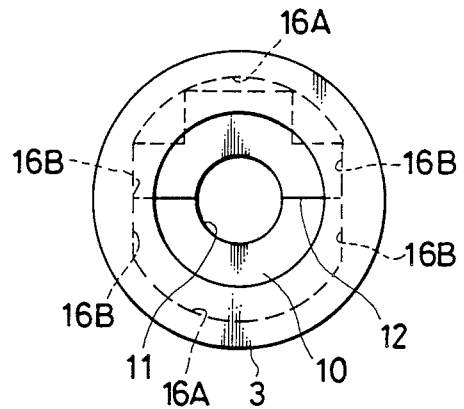
FIG. 7 is a right side view showing a second embodiment of a closure for a cable connector according to the invention.
Figure 8:
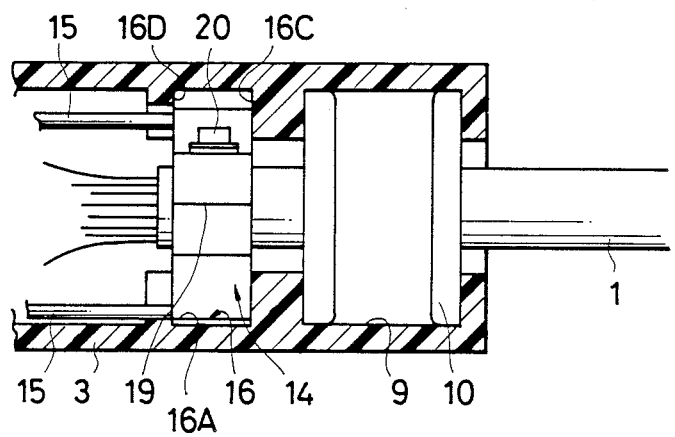
FIG. 8 is a longitudinal sectional view of FIG. 7.

FIGS. 7 and 8 show a second embodiment of a closure for a cable connector according to this invention.

In the second embodiment in FIGS. 7 and 8, constructions of main components are similar to that of the first embodiment in FIGS. 1 to 6 except that a rising wall 16D is formed also on the inner end side of the engaging recess 16.

In the second embodiment in FIGS. 7 and 8, the enclosure can endure against loads such as the tension, compressing and/or twist acting on the cables to enhance the effects in the amount of the additionally added rising wall 16D.

In the second embodiment in FIGS. 7 and 8, a connecting rod 15 may be omitted.

The connecting rod 15 can, in some cases, operate as a jig for defining the distance between both the grasping fittings 14.

In the embodiments described above, the axial and rotational movements of the grasping fittings 14 are restricted in the sleeve 3. However, the grasping fittings 14 may be restricted in the movements only by the axial restricting means or may be restricted in the movements only by the rotational restricting means.

The above-mentioned means are arbitrarily employed as the means for restricting the movements of the grasping fittings in the axial direction.

One of them is means for connecting both the grasping fittings 14 by the connecting rod 15 to contact the grasping fittings 14 of connected state with the rising wall 16C of the engaging recess 16.

Another of them is means for connecting both the grasping fitting 14 by the connecting rod 14 to contact the grasping fittings 14 of the connected state with the rising wall 16D of the engaging recess 16 (in which case the engaging recess 16 has no rising wall 16C).

Still another of them is means for engaging the grasping fittings 14 within the engaging recess 16 having rising walls 16C, 16D.

As the rotational restricting means, means for forming the noncircular shape of the profiles of the grasping fitting 14 and the engaging recess 16 as described above may be employed.

According to this invention as described above, the closure for the cable connector prevents the grasping fittings from moving axially and/or rotationally through the axial restricting means provided in the sleeve and/or rotational restricting means. Therefore, the closure of this invention can exhibit high mechanical strength against the loads such as tension, compression and/or twist of the cable.

Therefore, the enclosure of the invention can prevent the improper airtightness, the damage of the core wires and the transmitting characteristic in the sleeve from decreasing due to the unintentional movement of the grasping fittings.

What is claimed is:

1. An enclosure for a cable connector covered at the ends of the cables connected with each other in a sleeve through end face plates for closing both the ends of the sleeve and grasping fittings mounted in engaging recesses at the ends of the cable contained in the sleeve, comprising:
    means for resisting rotational movement of the cables including mating surfaces of said grasping fittings and said engaging recesses, said mating surfaces being formed to resist relative rotational movement;
    means interconnecting said grasping fittings for restricting axial movement of said cables in compression; and
    means for resisting axial movement of said cables in tension.

2. The enclosure for a cable connector according to claim 1, wherein said grasping fittings are engaged with a wall of said engaging recesses formed in the sleeve.

3. The enclosure for a cable connector according to claim 2, wherein said mating surfaces of said grasping fittings and engaging recesses are formed in a noncircular shape.

4. The enclosure for a cable connector according to claim 3, wherein said interconnecting means includes a connecting rod.

5. The enclosure for a cable connector according to claim 2, wherein said interconnecting means includes a connecting rod.

6. The enclosure for a cable connector according to claim 1, wherein said interconnecting means includes a connecting rod.

* * * * *